United States Patent
Rubino et al.

(10) Patent No.: US 11,742,520 B2
(45) Date of Patent: *Aug. 29, 2023

(54) LITHIUM ELECTROCHEMICAL CELL ACTIVATED WITH AN ELECTROLYTE CONTAINING DBC, LIBOB AND FEC ADDITIVES

(71) Applicant: Greatbatch Ltd., Clarence, NY (US)

(72) Inventors: Robert S. Rubino, Williamsville, NY (US); Joseph M. Lehnes, Williamsville, NY (US); Marcus J. Palazzo, Wheatfield, NY (US); David M. Spillman, Tonawanda, NY (US); Ho-Chul Yun, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/246,861

(22) Filed: May 3, 2021

(65) Prior Publication Data

US 2021/0359343 A1    Nov. 18, 2021

Related U.S. Application Data

(60) Provisional application No. 63/025,202, filed on May 15, 2020.

(51) Int. Cl.
*H01M 10/0567* (2010.01)
*H01M 10/0569* (2010.01)
(Continued)

(52) U.S. Cl.
CPC ....... *H01M 10/0567* (2013.01); *H01M 4/134* (2013.01); *H01M 4/54* (2013.01);
(Continued)

(58) Field of Classification Search
CPC ..... H01M 4/131; H01M 4/54; H01M 10/0567
See application file for complete search history.

(56) References Cited

U.S. PATENT DOCUMENTS

| 5,753,389 A | 5/1998 | Gan et al. |
| 6,551,747 B1 | 4/2003 | Gan |

(Continued)

FOREIGN PATENT DOCUMENTS

| JP | 2011054417 A | 3/2011 |
| JP | 5405238 | 11/2013 |

OTHER PUBLICATIONS

Heine, et al., ""Fluoroethylene Carbonate as Electrolyte Additive in Tetraethylene Glycol Dimethyl Ether Based Electrolytes for Application of Lithium Ion and Lithium Metal Batteries", Journal of The Electrochemical Society, 162 (6), A1094-A1101, 2015."

(Continued)

*Primary Examiner* — Stephan J Essex
(74) *Attorney, Agent, or Firm* — Michael F. Scalise (57) ABSTRACT

An electrochemical cell having a casing housing an electrode assembly of a separator residing between a lithium anode and a cathode comprising silver vanadium oxide and fluorinated carbon is described. The electrode assembly is activated with a nonaqueous electrolyte comprising a lithium salt dissolved in a solvent system of propylene carbonate mixed with 1,2-dimethoxyethane, dibenzyl carbonate (DBC), lithium bis(oxalato)borate (LiBOB), and fluoroethylene carbonate (FEC). Preferably DBC is present in an amount ranging from about 0.005 moles (M) to about 0.25M, LiBOB is present in an amount ranging from about 0.005 wt. 5 to about 5 wt. %, and FEC is present in an amount ranging from about 0.01 wt. % to about 10 wt. %. This electrolyte formulation is more conductive than the conventional or prior art binary and ternary solvent system electrolytes while being chemically and electrochemically (Continued)

stable toward Li/SVO cells, Li-SVO/CF$_x$ mixture cells, and Li-SVO/CF$_x$ sandwich cathode primary electrochemical cells.

9 Claims, 6 Drawing Sheets

(51) Int. Cl.
*H01M 10/0568* (2010.01)
*H01M 4/134* (2010.01)
*H01M 4/62* (2006.01)
*H01M 10/0525* (2010.01)
*H01M 4/54* (2006.01)
*H01M 4/02* (2006.01)

(52) U.S. Cl.
CPC ....... *H01M 4/625* (2013.01); *H01M 10/0525* (2013.01); *H01M 10/0568* (2013.01); *H01M 10/0569* (2013.01); H01M 2004/027 (2013.01); H01M 2004/028 (2013.01); H01M 2300/0034 (2013.01)

(56) References Cited

U.S. PATENT DOCUMENTS

| | | | |
|---|---|---|---|
| 8,906,546 B2 | 12/2014 | Ryu et al. | |
| 2003/0113628 A1 | 6/2003 | Paulot et al. | |
| 2007/0065726 A1* | 3/2007 | Yumoto | H01M 10/0569 |
| | | | 429/219 |
| 2007/0065728 A1* | 3/2007 | Zhang | H01M 4/134 |
| | | | 429/231.95 |
| 2015/0311532 A1* | 10/2015 | Chen | H01M 4/364 |
| | | | 429/213 |
| 2017/0133716 A1 | 5/2017 | Masuda et al. | |
| 2017/0194668 A1 | 7/2017 | Park | |

OTHER PUBLICATIONS

In re Kerkhoven, 626 F.2d 846, 850, 205 USPQ 1069, 1072 (CCPA 1980).

* cited by examiner

FIG. 1

Prior ART

LITHIUM ELECTROCHEMICAL CELL ACTIVATED WITH AN ELECTROLYTE CONTAINING DBC, LIBOB AND FEC ADDITIVES

CROSS-REFERENCE TO RELATED APPLICATION

This application claims priority to U.S. Provisional Application Serial No. 63/025,202, filed on May 15, 2020.

BACKGROUND OF THE INVENTION

1. Field of the Invention

This invention generally relates to the conversion of chemical energy to electrical energy. More particularly, the present invention relates to primary lithium-containing electrochemical cells activated with nonaqueous electrolytes containing dibenzyl carbonate (DBC), lithium bis(oxalato) borate (LiBOB) and fluoroethylene carbonate (FEC) as additives. An exemplary couple is a lithium anode paired with a silver vanadium oxide (SVO) cathode or with a SVO/carbon monofluoride ($CF_x$) cathode. If the latter, SVO and $CF_x$ are preferably contacted to opposite sides of a current collector, for example, in a SVO/current collector/$CF_x$/current collector/SVO sandwich-type configuration. In another embodiment, SVO and $CF_x$ are mixed together and the mixture is contacted to the opposite sides of the current collector.

In particular, the present invention relates to an electrolyte comprising a new solvent system for activating primary Li/SVO, lithium-SVO/$CF_x$ mixture, and lithium-SVO/$CF_x$ sandwich cathode active material couples. These types of electrochemical cells are useful for powering implantable medical devices, for example cardioverter defibrillators (ICD) and cardiac resynchronization therapy devices (CRT-D), which require high rates of discharge, stable operation, and predictable end-of-life.

2. Prior Art

The successful production of lithium electrochemical cells and their widespread application is largely dependent on the development of highly conductive and stable non-aqueous organic electrolytes. A general requirement of a nonaqueous organic electrolyte is that it is reductively and oxidatively stable toward both typically used anode active materials, for example, lithium metal and lithiated carbon, and typically used cathode active materials, for example, silver vanadium oxide (SVO), fluorinated carbon ($CF_x$), copper silver vanadium oxide (CSVO), manganese oxide ($MnO_2$), cobalt oxide ($CoO_2$), and others. For a high rate lithium cell application, an activating electrolyte with high conductivity is especially significant. Conventional non-aqueous organic electrolytes are composed of a lithium salt dissolved in an organic solvent system of either a single solvent or mixed solvents. However, to achieve high electrolyte conductivity, a combination of two solvents, one with a high dielectric constant and one with a low viscosity, is generally used.

In that respect, preferred lithium salts include $LiAsF_6$, $LiPF_6$, $LiBF_4$, $LiClO_4$, $LiSO_3CF_3$, among others. Typically used solvents include propylene carbonate (PC), ethylene carbonate (EC), γ-butyrolactone (GBL), sulfolane, 1,2-dimethoxyethane (DME), dimethyl carbonate (DMC), tetrahydrofuran (THF), diisopropyl ether (DIPE) 1,3-dioxolane, and others. Particularly stable and highly conductive electrolytes that have found widespread use in cells powering implantable medical devices, for example cardioverter defibrillators (ICD) and cardiac resynchronization therapy devices (CRT-D), have either 1.0M to 1.2M $LiAsF_6$ or 1.0M $LiPF_6$ dissolved in a 50:50, by volume, mixture of PC:DME. A particularly common electrolyte for high rate Li/SVO defibrillator cells uses $LiAsF_6$ as the preferred salt. Despite the success of 1.0M $LiAsF_6$/PC:DME=1:1 as an electrolyte, an improved electrolyte with higher conductivity and increased stability is desired for activating high rate, high power, and high capacity lithium primary electrochemical cells.

Figure 1:
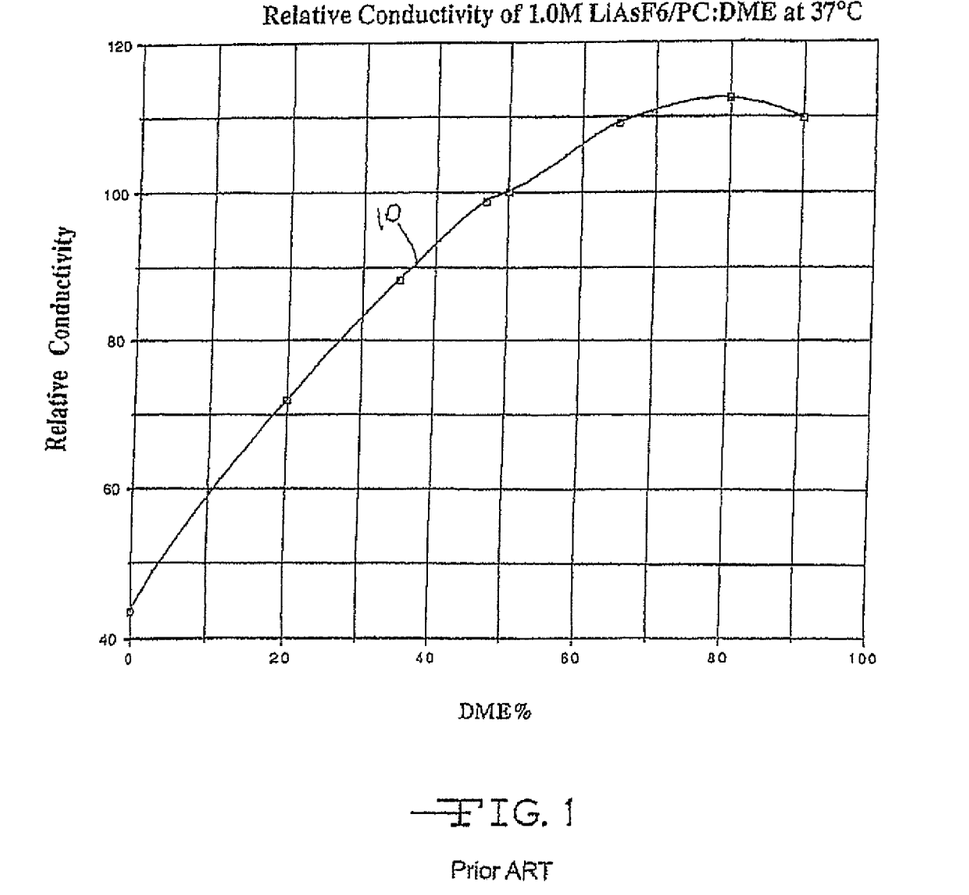
FIG. 1 is a graph of the relative conductivity of 1.0M LiAsF$_6$ dissolved in a binary mixture of PC:DME at various percentages of DME at 37° C.

It is interesting to note that the above-discussed electrolyte using a PC/DME solvent system does not provide maximum conductivity at its one-to-one volume ratio. As shown in FIG. 1, the maximum conductivity of 1.0M $LiAsF_6$ dissolved in PC/DME is at a volume ratio of 20:80. The conductivity of DME of about 19.5 mohms/cm at 37° C. is about 12.4% higher than that of PC of about 17.3 mohms/cm at 37° C. Consequently, the benefit of using an electrolyte of 1.0M $LiAsF_6$ dissolved in a solvent system of PC:DME at a volume ratio that is less than 50:50, for example at a ratio of 20:80, by volume, which has a higher conductivity, seems obvious for high rate lithium electrochemical cells.

However, an acceptable electrolyte must provide both high conductivity and high stability toward both the anode and cathode active materials. The high conductivity requirement is needed to significantly reduce or minimize internal resistance (IR) voltage drop during high current pulse discharge. The high stability requirement is desired to minimize impedance build-up at the solid electrolyte interface (SEI) at the anode and at the cathode. Therefore, high electrolyte conductivity does not necessarily mean better cell performance or improved discharge capacity. Indeed, when electrolytes of 1.0M $LiAsF_6$/PC:DME=40:60 or 30:70, by volume, are used to activate Li/SVO cells, the benefit of their high conductivity in a short term discharge test is completely cancelled by the presence of undesirable voltage delay resulting from impedance build-up at the solid electrolyte interface (SEI) during high current pulse discharge applications.

In that respect, it is believed that voltage delay in Li/SVO cells is at least partially related to electrolyte instability caused by the dissolution of vanadium ions from the SVO cathode active material into the electrolyte. The vanadium ions then re-deposit on the anode surface by reduction to produce a highly resistant surface film. The ion dissolution process is catalyzed by the presence of DME, which is a very good ligand molecule. As a linear ether, DME has a larger donation number (DN=20) than that of propylene carbonate having a DN=15.1. The donation number signifies the potential of a nucleophile molecule to donate an electron pair as described in the Lewis acid-base theory. To minimize or even eliminate the voltage delay phenomenon, a lower percentage of DME in the electrolyte solvent mixture is desired. However, by reducing the percentage of DME having a relatively high DN, the electrolyte conductivity is also decreased. Therefore, the electrolyte of 1.0M $LiAsF_6$/PC:DME=50:50, by volume, which is typically used to activate Li/SVO cells powering implantable medical devices, represents a compromise between maximizing the solvent system's conductivity and contemporaneously minimizing the undesirable effect of vanadium ions that have dissolved into the electrolyte.

Although the 1.0M $LiAsF_6$/PC:DME=50:50, by volume, electrolyte is satisfactory when activating Li/SVO, lithium- SVO/CF$_x$ mixture, and lithium-SVO/current collector/CF$_x$/current collector/SVO sandwich cathode cells used in cardioverter defibrillator and cardiac resynchronization therapy applications, and the like, its stability is less than desirable as it slowly decomposes to form a relatively highly resistive surface film on the opposite polarity electrodes at certain discharge values. This is signified by the voltage delay phenomena. For longer-term cell storage or usage, the voltage delay phenomenon becomes increasingly more obvious and severe. Therefore, in order to fully realize the improved capacity benefits of a Li/SVO cell, a lithium-SVO/CF$_x$ mixture cell, or a Li-SVO/CF$_x$ sandwich cathode cell, alternate electrolyte systems that are more conductive and more stable toward SVO than the binary solvent system of PC:DME have been investigated.

One alternate electrolyte system is described in U.S. Pat. No. 5,753,389 to Gan et al., which is assigned to the assignee of the present invention and incorporated herein by reference. The '389 patent to Gan et al. relates to an electrolyte system comprising 1.0M LiAsF$_6$/PC:DME with dibenzyl carbonate (DBC) used as an additive. In particular, the conductivity of a reference electrolyte and a test electrolyte containing dibenzyl carbonate (DBC) as an organic carbonate additive, both electrolytes activating a Li/SVO cell, was investigated. The reference electrolyte consisted of 1.0M LiAsF$_6$ dissolved in a 50:50, by volume, mixture of PC:DME having a conductivity of 17.30 mohms/cm (prior art reference electrolyte No. 1). Dibenzyl carbonate (DBC) (0.01M) was added to prior art reference electrolyte No. 1 to provide prior art test electrolyte No. 2.

The competing Li/SVO cells in the '389 patent to Gan et al., designated as prior art Li/SVO cell No. 1 and prior art Li/SVO cell No. 2, respectively, were discharged under a 1K ohm load for 1 hour and then discharged under a 2K ohm load. Once every two days these cells received a pulse train consisting of four 17.7 mA/cm$^2$, 10 second pulses with 15 seconds rest between each pulse. Four pulse trains were applied to each cell. In general, voltage delay in the first pulse can be observed for both cells in the third and fourth pulse trains.

Figure 2:
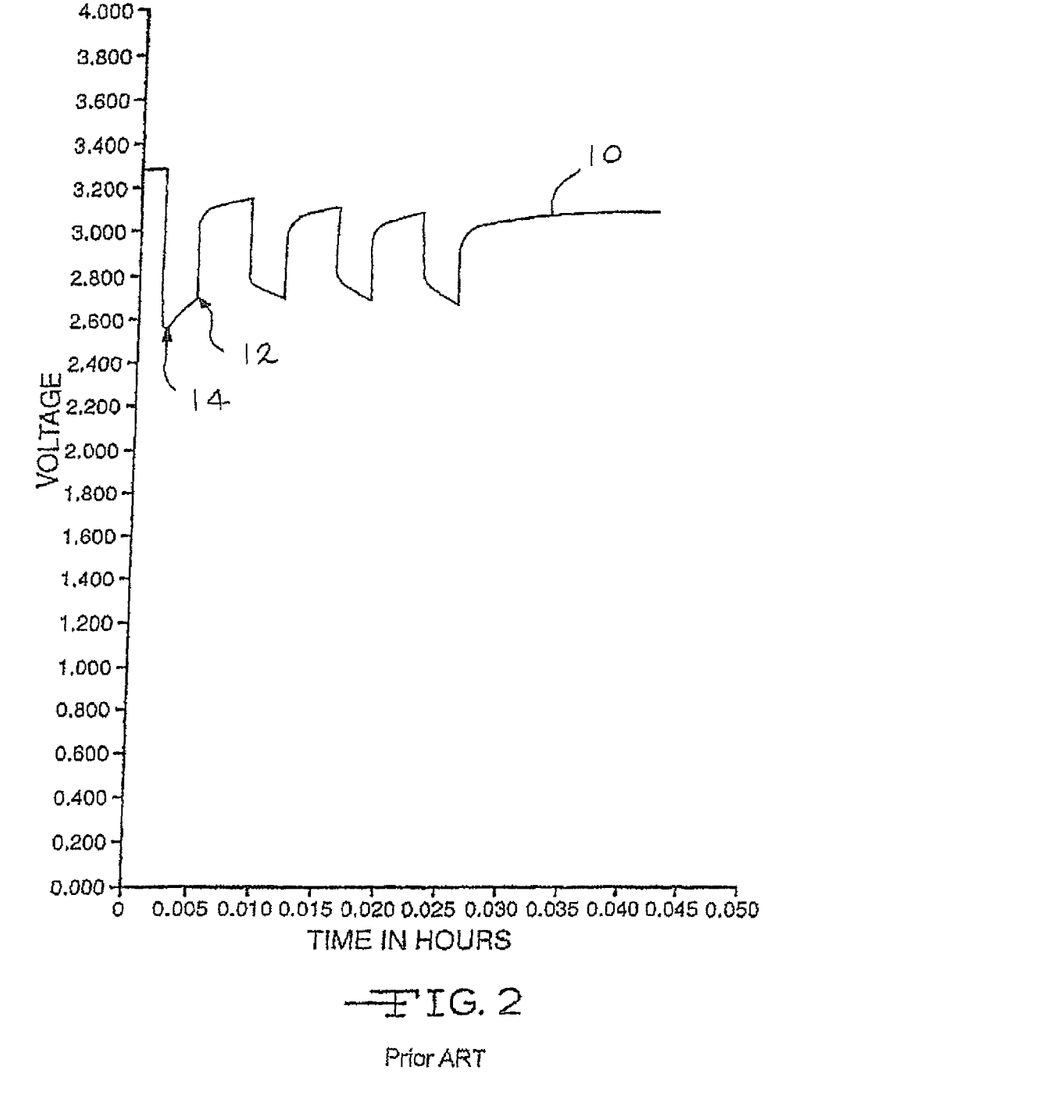
FIG. 2 is a reproduction of the graph of FIG. 1 from U.S. Pat. No. 5,753,389 to Gan et al. showing the pulse discharge curve 10 of a control electrochemical cell activated with an electrolyte comprising 1.0M LiAsF$_6$ dissolved in a 50:50 mixture, by volume, of an aprotic organic solvent system of PC:DME according to conventional practice.

As shown in FIG. 2, which is a reproduction of FIG. 1 from the '389 patent, voltage delay is defined as pulse 1 end potential minus pulse 1 minimum potential wherein in the pulse discharge curve 10, the pulse 1 end potential is indicated at 12 and pulse 1 minimum potential is indicated at 14. A positive value indicates the existence of voltage delay. The larger the positive value, the larger the voltage delay. The beneficial effects of the DBC organic additive on voltage delay are thus obtained by comparing the results of prior art test cell No. 2 having the DBC organic additive dissolved in the electrolyte solution with respect to the prior art reference cell No. 1 at pulse trains 3 and 4. The results from pulse train 4 are summarized in Table 1 below.

TABLE 1

Effect of DBC Additive on Test Cell Performance:
Voltage Delay in Fourth Pulse Train (V)

| Without DBC Additive ($P_{1end} - P_{1min}$) | With DBC Additive ($P_{1end} - P_{1min}$) |
|---|---|
| 0.13 | 0.07 |

The '389 patent to Gan et al. theorizes that the DBC organic carbonate additive is reduced to form a product which deposits on the anode surface. This surface film is ionically more conductive than the film formed in the absence of the DBC additive and is responsible for increased cell performance in terms of decreased voltage delay during high current pulse discharge. Since lithium carbonate is known to form a good ionically conductive film on lithium surfaces, the reductive cleavage of the O—X and/or the O—Y bonds in the DBC carbonate additive may produce lithium carbonate as the final product.

Thus, Li/SVO cells activated with an electrolyte comprising the PC and DME couple with a DBC additive exhibit good chemical and electrochemical stability in comparison to electrolytes comprising the binary solvent system of PC:DME, but that are devoid of the DBC additive. However, even though an electrolyte comprising PC and DME with a DBC additive is advantageous in terms of its long-term performance and stability in Li/SVO, Li-SVO/CF$_x$ mixture cells, and Li-SVO/CF$_x$ sandwich cathode primary electrochemical cells, that electrolyte system still exhibits a degree of voltage delay that can be improved. Thus, a new electrolyte system is needed that is chemically and electrochemically stable while having a higher conductivity than the conventional solvent systems described above.

Accordingly, the present invention is directed to an electrolyte system that is more conductive than the conventional or prior art binary and ternary solvent system electrolytes while being chemically and electrochemically stable toward Li/SVO cells, Li-SVO/CF$_x$ mixture cells, and Li-SVO/CF$_x$ sandwich cathode primary electrochemical cells.

SUMMARY OF THE INVENTION

The present invention relates to a primary lithium electrochemical cell that is suitable as a power source for an implantable device such as an ICD or CRT-D device. The electrochemical cell contains a lithium or lithium alloy anode, a cathode containing silver vanadium oxide (SVO) or manganese dioxide (MnO$_2$) alone, or with fluorinated carbon (CF$_x$) as a mixture, or in discreet layers contacted to the opposite sides of a current collector in a configuration of SVO/current collector/CF$_x$ or MnO$_2$/current collector/CF$_x$. The cathode active materials are preferably mixed with various conductive agents and binders. A porous polyolefin or glass fiber separator is positioned between the anode and cathode to permit ionic conductivity between the opposite polarity electrodes, but to prevent them from directly contacting each other. The preferred activating electrolyte consists of lithium hexafluoroarsenate (LiAsF$_6$) dissolved in a solvent system of from about 30:70 to about 50:50, by volume, propylene carbonate (PC) and dimethoxyethane (DME) to which dibenzyl carbonate (DBC), lithium bis(oxalato)borate (LiBOB) and fluoroethylene carbonate (FEC) are added to thereby provide the highest energy and power density. More preferably, dibenzyl carbonate (DBC) is added to the electrolyte in an amount ranging from about 0.005 moles (M) to about 0.25M, most preferably in an amount of about 0.05M, lithium bis(oxalato)borate (LiBOB) is added in an amount ranging from about 0.005 wt. % to about 5 wt. %, most preferably in an amount of about 0.1 wt. %, and fluoroethylene carbonate (FEC) is added in an amount ranging from about 0.01 wt. % to about 10 wt. %, most preferably in an amount of about 0.5 wt. %.

These and other objects of the present invention will become increasingly more apparent to those skilled in the art by reference to the following description and to the accompanying drawings.

DETAILED DESCRIPTION OF THE PREFERRED EMBODIMENTS

As used herein, the term "pulse" means a short burst of electrical current of a significantly greater amplitude than that of a pre-pulse current, immediately prior to the pulse. A pulse train consists of at least two pulses of electrical current delivered in relatively short succession with or without open circuit rest between the pulses. An exemplary pulse train consists of four 10 second pulses (40.0 mA/cm$^2$) with a 15 second rest between each pulse.

An electrochemical cell according to the present invention is preferably of a primary chemistry. For the cell to possess sufficient energy density and discharge capacity required to meet the rigorous requirements of implantable medical devices, the anode for the primary cell is a thin metal sheet or foil of lithium, pressed or rolled on a metallic anode current collector, i.e., preferably comprising titanium, titanium alloy or nickel. An alternate anode comprises a lithium alloy for example, Li—Si, Li—Al, Li—B, Li—Mg and Li—Si—B alloys and intermetallic compounds. The greater the amounts of the secondary material present by weight in the alloy, however, the lower the energy density of the cell.

The anode current collector has an extended tab or lead contacted by a weld to a cell case of conductive metal in a case-negative electrical configuration. Alternatively, the anode may be formed in some other geometry, such as a bobbin shape, cylinder or pellet, to allow for a low surface cell design.

It is generally recognized that for lithium cells, silver vanadium oxide (SVO) and, in particular, $\in$-phase silver vanadium oxide (AgV$_2$O$_{5.5}$), is preferred as the cathode active material for high rate cell discharge applications. This active material has a theoretical volumetric capacity of 1.37 Ah/ml. By comparison, the theoretical volumetric capacity of CF$_x$ (x=1.1) is 2.42 Ah/ml, which is 1.77 times that of $\in$-phase silver vanadium oxide. However, for powering a cardiac defibrillator, SVO is preferred because it can deliver high current pulses or high energy within a relatively short period of time. Although CF$_x$ has higher volumetric capacity, it is not useful as the sole cathode active material in medical devices requiring a high rate discharge application. This is due to its relatively low to medium rate of discharge capability. That is one of the reasons the lithium-SVO/CF$_x$ sandwich cathode cells disclosed by Gan in U.S. Pat. No. 6,551,747 are advantageous for providing both high energy capacity and high discharge rate in a single device.

The '747 patent to Gan, which is assigned to the assignee of the present invention and incorporated herein by reference, describes a sandwich cathode design preferably having fluorinated carbon (CF$_x$)$_n$ as a first cathode active material of a relatively higher energy density, but of a relatively lower rate capability sandwiched between two current collectors, and preferably having silver vanadium oxide (SVO) as a second cathode active material of a relatively lower energy density, but of a relatively higher rate capability in contact with the opposite sides of the current collectors.

Fluorinated carbon as the cathode active material of a relatively higher energy density, but of a relatively lower rate capability is represented by the formula (CF$_x$)$_n$, wherein x ranges from about 0.1 to about 1.9, and preferably from about 0.5 to about 1.2. An alternate fluorinated carbon material that is useful with the present invention is (C$_2$F)$_n$, wherein n refers to the number of monomer units which can vary widely.

In addition to $\in$-phase silver vanadium oxide having x=1.0 and y=5.5 in the general formula SM$_x$V$_2$O$_y$, β-phase silver vanadium oxide having in the general formula x=0.35 and y=5.8, and γ-phase silver vanadium oxide having in the general formula x=0.80 and y=5.40 are also useful cathode active materials of relatively low energy density, but relatively high rate capability. For a more detailed description of such cathode active materials, reference is made to U.S. Pat. No. 4,310,609 to Liang et al. This patent is assigned to the assignee of the present invention and incorporated herein by reference.

Silver vanadium oxide (SVO) as the preferred first cathode active material having a greater rate capability than the second cathode active material is typically provided in a formulation or mixture facing the anode of, by weight, about 90% to about 95% SVO, about 1% to about 4% binder and about 1% to about 4% conductive diluent. Fluorinated carbon (CF$_x$) as the second active material is in contact with the other side of the current collector and is preferably provided in a second active mixture having CF$_x$ ranging from about 90% to 95% with the remaining constituents being about 1% to about 5% of a binder and about 1% to about 5% of one or more conductive diluents.

A suitable binder material is preferably a thermoplastic polymeric material. The term thermoplastic polymeric material is used in its broadest sense and any polymeric material which is inert in the cell and which passes through a thermoplastic state, whether it finally sets or cures, is included within the term "thermoplastic polymer". Representative binder materials include polyethylene, polypropylene, polyimide, and fluoropolymers such as fluorinated ethylene, fluorinated propylene, polyvinylidene fluoride (PVDF), and polytetrafluoroethylene (PTFE) at about 1 to about 5 weight percent of the cathode mixture. Natural rubbers are also useful as the binder material with the present invention.

Up to about 10 weight percent of a conductive diluent is preferably added to the cathode mixture. Suitable conductive diluents include acetylene black, carbon black and/or graphite. Metals such as nickel, aluminum, titanium and stainless steel in powder form are also useful as conductive diluents. A preferred conductive diluent for both SVO and CF$_x$ is carbon. The use of carbon increases the conductivity of SVO and $CF_x$. It is believed that this in turn improves the pulse discharge performance of the cell, especially during the first third of the cell's discharge life.

Thus, an exemplary silver vanadium oxide formulation has about 94% SVO mixed with about 3% PTFE binder and about 3% carbonaceous diluent. An exemplary fluorinated carbon formulation has about 91% $CF_x$ mixed with about 5% PTFE binder and about 4% carbonaceous diluent.

In addition to silver vanadium oxide, the first cathode active material may be comprised of $V_2O_5$, $MnO_2$, $LiCoO_2$, $LiNiO_2$, $LiMn_2O_4$, $TiS_2$, $Cu_2S$, FeS, $FeS_2$, copper oxide, copper vanadium oxide, copper silver vanadium oxide, and mixtures thereof. In addition to fluorinated carbon, the second cathode active material may be comprised of $Ag_2O$, $Ag_2O_2$, $CuF_2$, $Ag_2CrO_4$, $MnO_2$, and mixtures thereof. In a broader sense, however, it is contemplated by the present invention that the first cathode active material may be any material which has a relatively higher rate capability than the second cathode active material.

Another embodiment for a cathode according to the present invention has the first and second cathode active materials provided in a homogeneous mixture contacted to at least one side, and preferably both sides, of a current collector.

The cathode for an electrochemical cell according to the present invention having the previously described first and second cathode active materials may be made in a variety of "sandwich" configurations. The cathode current collector is preferably formed as an elongated sheet having a first side and a second side with the disparate cathode active materials contacted to the opposite sides thereof. The cathode current collector may be formed from stainless steel, titanium, tantalum, platinum, gold, aluminum, aluminum alloys, cobalt nickel alloys, nickel-containing alloys, highly alloyed ferritic stainless steel containing molybdenum and chromium, and nickel-, chromium-, and molybdenum-containing alloys. In a preferred embodiment, the cathode current collector is aluminum. In another embodiment, the current collector is titanium having a coating selected from the group consisting of graphite/carbon material, iridium, iridium oxide and platinum provided thereon.

Additionally, the cathode may include two or more current collectors with the overall design being independent of the exact screen or cell stack configuration. Exemplary cathode designs include:

SVO/current collector/$CF_x$, with the SVO facing the anode;

$CF_x$/first current collector/SVO, with the $CF_x$ facing the anode;

SVO/$CF_x$/current collector/$CF_x$/SVO;

SVO/first current collector/$CF_x$/second current collector/SVO;

SVO/first current collector/SVO/$CF_x$/SVO/second current collector/SVO;

$CF_x$/first current collector/SVO/second current collector/$CF_x$; and $CF_x$/first current collector/$CF_x$/SVO/$CF_x$/second current collector/$CF_x$.

In embodiments of the present electrochemical cells in which the disparate cathode active materials are delivered in the form of a paste or slurry applied to opposite sides of a current collector, the slurries are provided by dissolving or dispersing the desired cathode active material, conductive diluent and binder in a solvent. Suitable solvents include water, methyl ethyl ketone, cyclohexanone, isophorone, N-methyl-2-pyrrolidone (NMP), N,N-dimethylformamide, N,N-dimethylacetamide, toluene, and mixtures thereof.

To prevent internal short circuit conditions, the sandwich cathode of the present electrochemical cells is separated from the lithium anode by a suitable separator material. The separator is of an electrically insulative material, and the separator material is also chemically unreactive with the anode and cathode active materials and both chemically unreactive with and insoluble in the electrolyte. In addition, the separator material has a degree of porosity sufficient to allow flow there through of the electrolyte during electrochemical reactions of the cell.

Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.), and a membrane commercially available under the designation DEXIGLAS (C. H. Dexter, Div., Dexter Corp.).

The electrochemical cells of the present invention further include a nonaqueous, ionically conductive electrolyte which serves as a medium for migration of ions between the anode and the cathode during electrochemical reactions of the cell. The electrochemical reaction at the electrodes involves conversion of ions in atomic or molecular forms which migrate from the anode to the cathode. Thus, suitable nonaqueous electrolytes are substantially inert to the anode and cathode active materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. The inorganic, ionically conductive salt serves as the vehicle for migration of the lithium anode ions to intercalate or react with the cathode active materials. Known lithium salts that are useful as a vehicle for transport of lithium ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the electrochemical cells of the present invention, the preferred electrolyte comprises 0.8M to 1.5M $LiAsF_6$ or $LiPF_6$ dissolved in a 20:80 to 50:50 mixture, by volume, of propylene carbonate (PC) as the preferred high permittivity solvent and 1,2-dimethoxyethane (DME) as the preferred low viscosity solvent, more preferably, 1.2M $LiAsF_6$ dissolved in a 30:70 mixture, by volume, of PC and DME.

To this electrolyte, dibenzyl carbonate (DBC), lithium bis(oxalato)borate (LiBOB) and fluoroethylene carbonate (FEC) are added to provide improved energy and power density. More preferably, dibenzyl carbonate (DBC) is added to the electrolyte in an amount ranging from about 0.005 moles (M) to about 0.25M, most preferably in an amount of about 0.05M, lithium bis(oxalato)borate (LiBOB) is added in an amount ranging from about 0.005% wt. % to about 5% wt. %, most preferably in an amount of about 0.1 wt. %, and fluoroethylene carbonate (FEC) is added in an amount ranging from about 0.01 wt. % to about 10 wt. %, and most preferably in an amount of about 0.5 wt. %. Another preferred electrolyte according to the present invention consists of 1.2M $LiAsF_6$ dissolved in a 50:50 mixture, by volume, of PC:DME with about 0.05M DBC, about 0.1 wt. % LiBOB and about 0.5 wt. % FEC additives.

The assembly of the cells described herein is preferably in the form of a prismatic configuration. The cells may also be in the form of a wound element configuration. That is, the fabricated anode, cathode and separator may be wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum, aluminum, and niobium, but not limited thereto, so long as the metallic material is compatible for use with the other cell components.

The cell header may be comprised of a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin for the feedthrough preferably comprises titanium although molybdenum, aluminum, nickel alloy, niobium, and stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless-steel ball over the fill hole, but not limited thereto.

The above assembly describes a case-negative cell, which is the preferred construction of the cells of the present invention. As is well known to those skilled in the art, however, the present electrochemical cells can also be constructed in a case-positive configuration.

The following example describes the manner and process of electrochemical cells according to the present invention. The example sets forth the best mode contemplated by the inventors of carrying out the invention, but it is not to be construed as limiting.

EXAMPLE

Ten cells were built containing anodes of lithium metal pressed onto a nickel current collector ribbon. Cathodes were built having cathode active materials pressed onto two layers of aluminum foil current collector to provide an electrode configuration of: SVO/current collector/$CF_x$/current collector/SVO. The SVO material was E-phase SVO with a stoichiometry formula of $Ag_2V_4O_{11}$. A prismatic cell stack assembly configuration with two layers of macroporous membrane (polyethylene) separator sandwiched between the anode and cathode was prepared. The electrode assembly was then hermetically sealed in a stainless-steel casing in a case negative configuration.

Prior art cells 1 to 5 were activated with an electrolyte of 1.2M $LiAsF_6$ dissolved in a solvent system of 0.05M DBC/PC:DME=30:70, by volume. Present invention cells 6 to 10 were activated with an electrolyte of 1.2M $LiAsF_6$ dissolved in a solvent system of PC:DME=30:70, by volume and additionally 0.05M dibenzyl carbonate (DBC), 0.1 wt. % of lithium bis(oxalato)borate (LiBOB) and 0.5 wt. % of fluoroethylene carbonate (FEC). The theoretical capacity of the ten cells was 1.883 Ah.

The cells were discharged at 72° C. under a 4.32 kohm background load. The pulse regimen consisted of four consecutive 10-second pulses at 3,228 mA with 15 seconds on background load applied once every 7 days.

Figure 3:
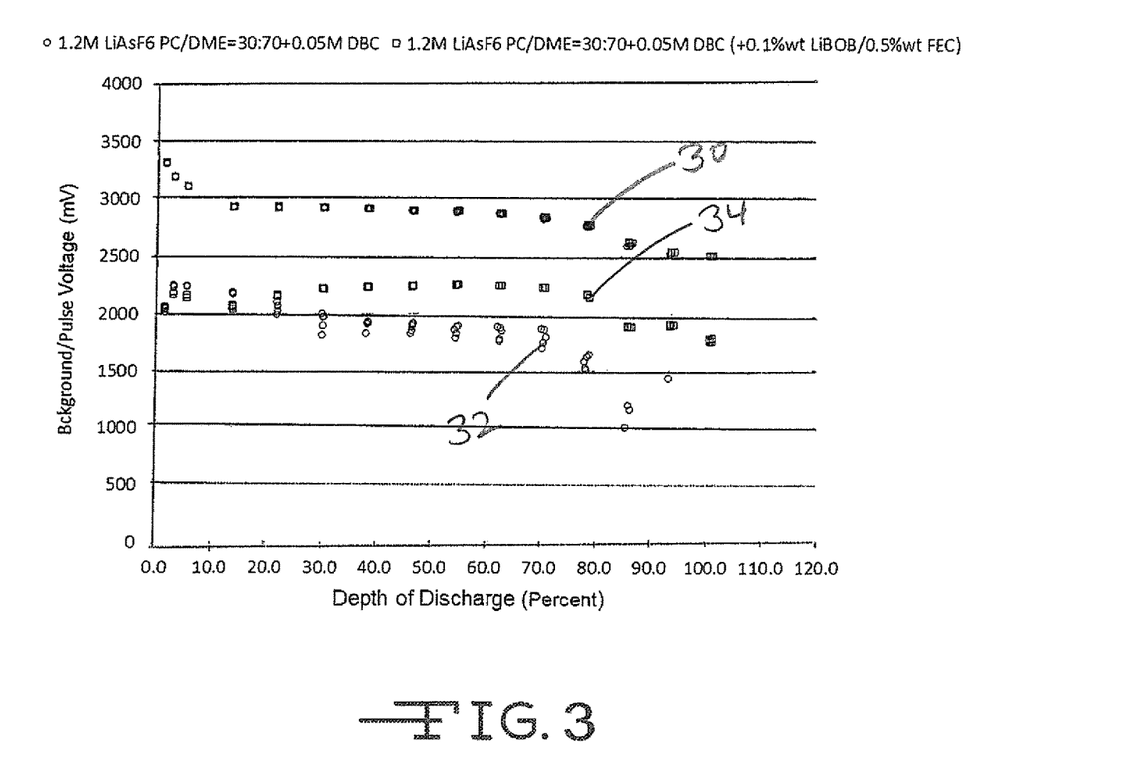
FIG. 3 is a graph comparing the pulse 1 minimum voltage of a pulse discharged Li/SVO-CF$_x$ sandwich cathode electrochemical cell activated with an electrolyte having 1.2M LiAsF$_6$ dissolved in a 30:70 mixture, by volume, of PC/DME including 0.05M DBC according to convention practice in comparison to a similarly built cell activated with an electrolyte having 1.2M LiAsF$_6$ dissolved in a 30:70 mixture, by volume, of PC/DME with 0.05M DBC and further including 0.1 wt. % LiBOB and 0.5 wt. % FEC according to the present invention.
Figure 4:
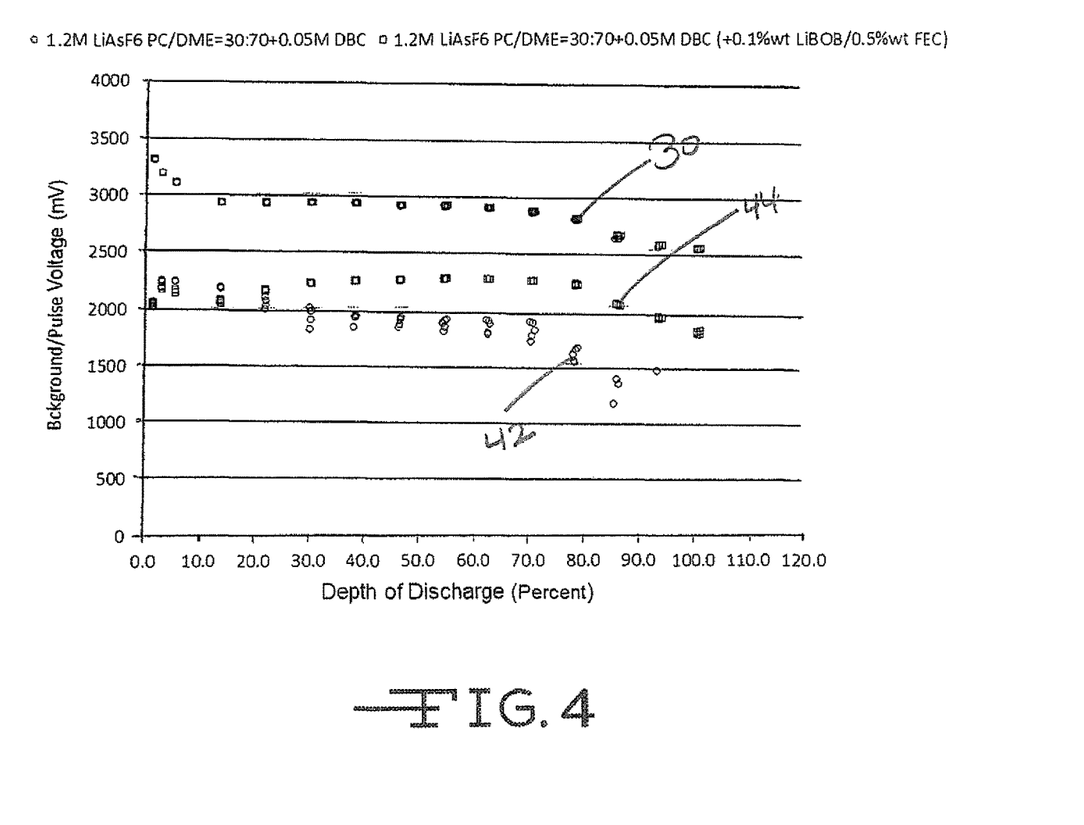
FIG. 4 is a graph comparing the pulse 1 last voltage of the prior art and present invention cells used to construct the graph shown in FIG. 3.

FIGS. 3 and 4 are graphs showing the same background voltages for the five present invention cells 6 to 10 (generally indicated as curve 30). The background voltages for the cells generally overlay each other.

Curves 32 and 34 in FIG. 3 generally indicate the respective pulse 1 minimum voltages of the five prior art cells 1 to 5 in comparison to cells 6 to 10 of the present invention. Curves 42 and 44 in FIG. 4 generally indicate the respective pulse 1 last voltages of the five prior art cells 1 to 5 in comparison to cells 6 to 10 of the present invention. It is noted that the pulse 1 minimum voltages and the pulse 1 last voltages for all the cells are very similar in FIGS. 3 and 4. This indicates that neither the prior art cells 1 to 5 nor the present invention cells 6 to 10 exhibited voltage delay. However, the pulse 1 minimum voltages and the pulse 1 last voltages for the present invention cells 6 to 10 are significantly higher than those of the prior art cells 1 to 5, indicating that the addition of DBC, LiBOB and FEC has a significant effect on the improved discharge performance of the present invention cells 6 to 10.

Figure 5:
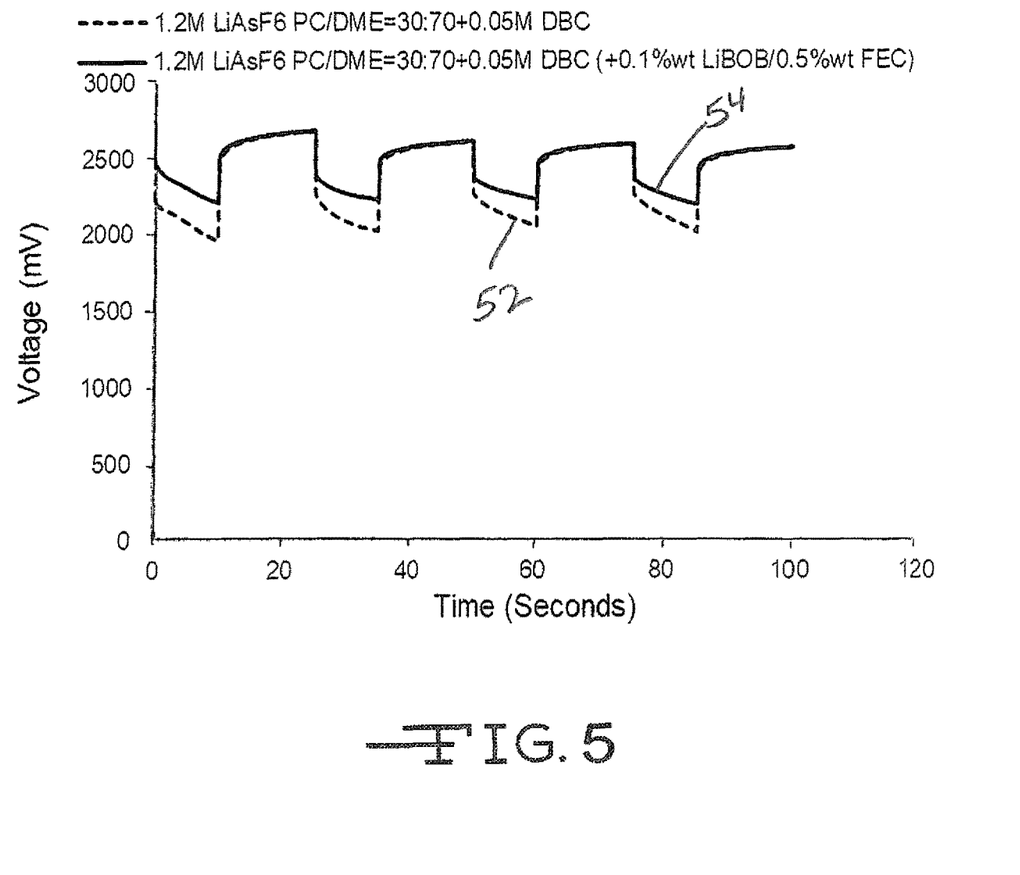
FIG. 5 is a graph comparing the pulse waveforms at about 30% depth of discharge for the prior art and present invention cells used to construct FIGS. 3 and 4.
Figure 6:
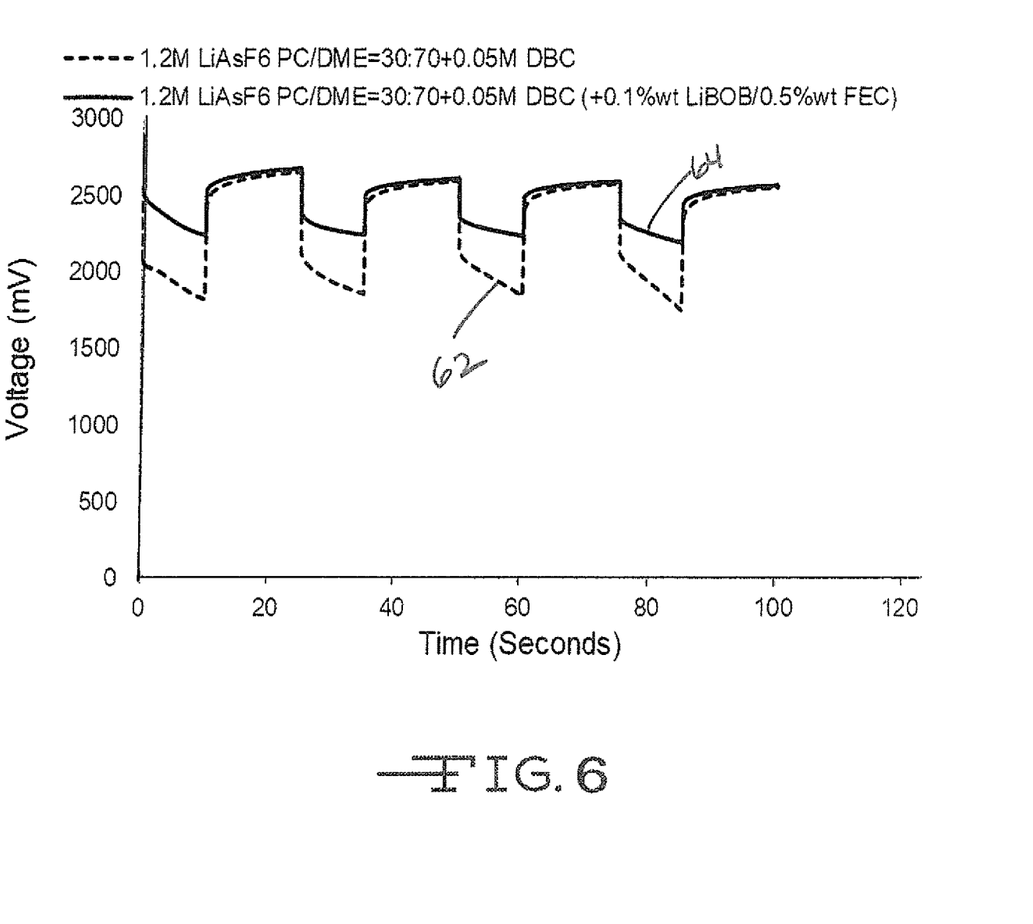
FIG. 6 is a graph comparing the pulse waveforms at about 54% depth of discharge for the prior art and present invention cells used to construct FIGS. 3 and 4.

FIGS. 5 and 6 are graphs comparing the pulse waveforms at about 30% and 54% depth of discharge (DoD), respectively, for a representative one of the prior art cells 1 to 5 in comparison to a representative one of the present invention cells 6 to 10. In particular, curves 52 and 54 in FIG. 5 are respective representative waveforms for one of the prior art cells 1 to 5 in comparison to one of the present invention cells 6 to 10 at 30% DoD. Throughout the pulse discharge waveform, the representative present invention cell maintained a higher voltage than the representative prior art cell. Curves 62 and 64 in FIG. 6 are respective representative waveforms for one of the prior art cells 1 to 5 in comparison to one of the present invention cells 6 to 10 at 54% DoD. Throughout the pulse discharge waveform, the representative present invention cell maintained a higher voltage than the representative prior art cell.

As discussed in the Prior Art section of this specification above, voltage delay is present when the pulse 1 end potential minus the pulse 1 minimum potential is a positive value (FIG. 2). However, in FIGS. 5 and 6, voltage delay is not present as the pulse minimum potentials and the pulse end potentials for pulses 1 to 4 coincide.

Thus, the addition of DBC, LiBOB and FEC as additives to an electrolyte comprising a lithium salt dissolved in a solvent system of a low viscosity solvent and a high permittivity solvent improves the performance of an implantable lithium electrochemical cell activated with the electrolyte. The addition of DBC, LiBOB and FEC to such electrolytes also increases both the volumetric energy and power density of an implantable lithium electrochemical

What is claimed is:

1. An electrochemical cell, comprising:
   a) a casing;
   b) an electrode assembly housed inside the casing, the electrode assembly comprising:
      i) a lithium anode;
      ii) a cathode comprising silver vanadium oxide (SVO); and
      iii) a separator residing between the anode and the cathode to prevent them from direct physical contact with each other; and
   c) a nonaqueous electrolyte provided in the casing in physical contact with the anode and the cathode, the electrolyte comprising:
      i) $LiAsF_6$ in a molar ratio ranging from about 0.8M to about 1.5M dissolved in a solvent system comprising propylene carbonate (PC) and dimethoxy ethane (DME) in a ratio ranging from about 20:80 PC:DME to about 50:50 PC:DME, by volume;
      ii) dibenzyl carbonate (DBC) in an amount ranging from about 0.03 moles (M) to about 0.07M;
      iii) lithium bis(oxalato)borate (LiBOB) in an amount ranging from about 0.05 wt. % to about 1.0 wt. %; and
      iv) fluoroethylene carbonate (FEC) in an amount ranging from about 0.1 wt. % to about 1.0 wt. %.

2. The electrochemical cell of claim 1, wherein the cathode further comprises fluorinated carbon.

3. The electrochemical cell of claim 2, wherein the fluorinated carbon is $(C_2F)_n$ or has the formula $(CF_x)_n$ with x ranging from about 0.1 to about 1.9, and mixtures thereof.

4. The electrochemical cell of claim 2, wherein the silver vanadium oxide is mixed with the fluorinated carbon.

5. The electrochemical cell of claim 2, wherein the silver vanadium oxide (SVO) and the fluorinated carbon ($CF_x$) are contacted to opposite sides of at least one current collector in a configuration selected from:
   a) SVO/current collector/$CF_x$, with the SVO facing the anode;
   b) $CF_x$/first current collector/SVO, with the $CF_x$ facing the anode;
   c) SVO/$CF_x$/current collector/$CF_x$/SVO;
   d) SVO/first current collector/$CF_x$/second current collector/SVO;
   e) SVO/first current collector/SVO/$CF_x$/SVO/second current collector/SVO;
   f) $CF_x$/first current collector/SVO/second current collector/$CF_x$; and
   g) $CF_x$/first current collector/$CF_x$/SVO/$CF_x$/second current collector/$CF_x$.

6. An electrochemical cell, comprising:
   a) a casing;
   b) an electrode assembly housed inside the casing, the electrode assembly comprising:
      i) a lithium anode;
      ii) a cathode comprising silver vanadium oxide (SVO) and fluorinated carbon; and
      iii) a separator residing between the anode and the cathode to prevent them from direct physical contact with each other; and
   c) a liquid, nonaqueous electrolyte provided in the casing in physical contact with the anode and the cathode, the electrolyte comprising:
      i) $LiAsF_6$ in a molar ratio ranging from about 0.8M to about 1.5M dissolved in a solvent system comprising propylene carbonate (PC) mixed with 1,2-dimethoxyethane (DME) in a ratio ranging from about 20:80 PC:DME to about 50:50 PC:DME, by volume;
      ii) dibenzyl carbonate (DBC) in an amount ranging from about 0.03 moles (M) to about 0.07M;
      iii) lithium bis(oxalato)borate (LiBOB) in an amount ranging from about 0.05 wt. % to about 1.0 wt. %; and
      iv) fluoroethylene carbonate (FEC) in an amount ranging from about 0.1 wt. % to about 1.0 wt. %.

7. The electrochemical cell of claim 6, wherein the fluorinated carbon is $(C_2F)_n$ or has the formula $(CF_x)_n$ with x ranging from about 0.1 to about 1.9, and mixtures thereof.

8. The electrochemical cell of claim 6, wherein the silver vanadium oxide is mixed with the fluorinated carbon.

9. The electrochemical cell of claim 6, wherein the silver vanadium oxide (SVO) and the fluorinated carbon ($CF_x$) are contacted to opposite sides of at least one current collector in a configuration selected from:
   a) SVO/current collector/$CF_x$, with the SVO facing the anode;
   b) $CF_x$/first current collector/SVO, with the $CF_x$ facing the anode;
   c) SVO/$CF_x$/current collector/$CF_x$/SVO;
   d) SVO/first current collector/$CF_x$/second current collector/SVO;
   e) SVO/first current collector/SVO/$CF_x$/SVO/second current collector/SVO;
   f) $CF_x$/first current collector/SVO/second current collector/$CF_x$; and
   g) $CF_x$/first current collector/$CF_x$/SVO/$CF_x$/second current collector/$CF_x$.